United States Patent
Preisler et al.

[19]
[11] Patent Number: 6,047,984
[45] Date of Patent: Apr. 11, 2000

[54] AIR BAG COVER AND METHOD OF MAKING SAME

[75] Inventors: Darius J. Preisler, Macomb; Jason T. Murar, Clinton Township, both of Mich.

[73] Assignee: Larry J. Winget, Leonard, Mich.

[21] Appl. No.: 09/055,848

[22] Filed: Apr. 6, 1998

[51] Int. Cl.$^7$ ................................................. B60R 21/16
[52] U.S. Cl. ........................................ 280/728.2; 280/731
[58] Field of Search ........................... 280/728.2, 728.3, 280/731

[56] References Cited

U.S. PATENT DOCUMENTS

| | | |
|---|---|---|
| 3,458,386 | 7/1969 | Shanok et al. . |
| 4,139,664 | 2/1979 | Wenrick . |
| 4,325,568 | 4/1982 | Clark et al. . |
| 4,515,649 | 5/1985 | Nussbaum . |
| 4,663,210 | 5/1987 | Schreiber et al. . |
| 4,934,735 | 6/1990 | Embach . |
| 5,085,462 | 2/1992 | Gualtier . |
| 5,110,647 | 5/1992 | Sawada et al. . |
| 5,141,247 | 8/1992 | Barth ..................................... 280/728.2 |
| 5,180,187 | 1/1993 | Muller et al. . |
| 5,186,490 | 2/1993 | Adams et al. . |
| 5,226,998 | 7/1993 | Few . |
| 5,239,147 | 8/1993 | Allard et al. . |
| 5,280,946 | 1/1994 | Adams et al. . |
| 5,283,404 | 2/1994 | Prescaro, Jr. . |
| 5,294,147 | 3/1994 | Edge . |
| 5,306,040 | 4/1994 | Leonelli et al. . |
| 5,322,324 | 6/1994 | Hansen et al. . |
| 5,338,060 | 8/1994 | Soderquist . |
| 5,342,086 | 8/1994 | Harris et al. . |
| 5,346,249 | 9/1994 | Hallard et al. . |
| 5,369,232 | 11/1994 | Leonelli . |
| 5,395,668 | 3/1995 | Ito et al. . |
| 5,529,336 | 6/1996 | Eckhout . |
| 5,851,022 | 12/1998 | Yamamoto et al. .................. 280/728.3 |

FOREIGN PATENT DOCUMENTS

| | | |
|---|---|---|
| 4035975-A | 5/1992 | Germany . |
| 4113591-A | 11/1992 | Germany . |
| 2-171381 | 7/1990 | Japan . |
| 3-143752 | 6/1991 | Japan . |
| 4-151345 | 5/1992 | Japan . |
| 5-24495 | 2/1993 | Japan . |
| 2 262 488 | 6/1993 | Japan . |
| 5-139231 | 6/1993 | Japan . |
| 2 252 274 | 8/1992 | United Kingdom . |

*Primary Examiner*—Kenneth R. Rice
*Attorney, Agent, or Firm*—Brooks & Kushman P.C.

[57] ABSTRACT

An air bag cover having a decorative badge secured thereto is made by injection molding a thermoplastic elastomeric body in an injection mold having a shape defining the air bag cover. Slots are formed at predetermined spaced locations extending through the air bag cover. The decorative badge has a plurality of tabs extending therefrom at predetermined spaced locations corresponding to the spaced locations of the slots formed in the air bag cover. The tabs are inserted through the slots at a front surface of the air bag cover and bent against a rear surface of the air bag cover to create a substantially constant load on the elastomeric body. The elastomeric body exerts an opposing reaction to the constant load so as to allow the decorative badge to be secured to the air bag cover.

23 Claims, 3 Drawing Sheets

AIR BAG COVER AND METHOD OF MAKING SAME

TECHNICAL FIELD

This invention relates to plastic air bag covers having decorative badges attached thereto and methods of making same.

BACKGROUND ART

Conventional air bag covers used in conjunction with occupant restraint systems may sometimes include decorative badges attached thereto. These decorative badges are aesthetically pleasing and help to enhance the overall appearance of the interior of the automotive vehicle. Since an air bag cover moves away from the steering column during automatic inflation of the air bag, the associated decorative badge must be securely attached thereto so that it does not come off during this action.

There are several known methods for attaching decorative badges to air bag covers. One such method includes securing the badges utilizing tabs, as shown in FIGS. 3–4. The decorative badge 10 has a plurality of tabs 12, each having a hole/opening 14 therein at the end of the tab 12, extending from a rear surface of the badge 10. Similarly, the air bag cover 16 has matching tabs 18 extending from a rear surface of the cover, wherein each of the air bag cover tabs have openings corresponding to the openings in the tabs of the badge.

The tabs 12 on the badge 10 are pushed through corresponding slots 20 in the air bag cover 16 so that the openings in the tabs 12, 18 are aligned. The badge 10 is then secured to the air bag cover 16 utilizing rivets 22. Although this type of attachment is secure, it requires a complicated molding process for the air bag cover, as well as the added cost of the rivets.

Furthermore, U.S. Pat. No. 5,529,336 issued to Eckhout discloses an air bag cover having a decorative applique fastened thereto. The decorative applique is disposed adjacent the tear seam in a non-overlapping fashion to prevent any interference with the inflation or exit of the air bag upon operation. The decorative applique includes a thin plastic layer extruded onto a decorative applique film. The decorative applique assembly is attached to the air bag cover by inserting connecting towers extending from the rear surface of the applique through fastening apertures which extend completely through the front cover of the air bag cover. A portion of the connecting tower extends out from the fastening aperture so that it may be deformed to form a retaining member larger in diameter than the fastening aperture so as to affix the applique to the air bag cover. The preferred method of deforming the portion includes applying a stream of heated air to the portion to melt the portion and then applying a cold stake directly to the melted portion to form the retaining member.

U.S. Pat. No. 4,139,664 issued to Wenrick discloses an elongated extruded strip adapted to be mechanically secured to a slotted sheet-like substrate. A thermoplastic material is continuously extruded in any desired cross-sectional configuration including a rear face having at least one rearwardly projecting rail. Longitudinally spaced apart sections of this rail are removed to provide longitudinally spaced rearwardly projecting teeth which enable mechanical securement of the extrusion to a supporting substrate having slots through which the teeth are extended.

Thus, there exists a need for an inexpensive and simple method of making an air bag cover having a decorative badge secured thereto without sacrificing safety.

DISCLOSURE OF THE INVENTION

It is thus a general object of the present invention to provide an air bag cover having a decorative badge secured thereto and a simple, inexpensive method of making same.

It is another object of the present invention to provide a method of making an air bag cover having a decorative badge secured thereto in which the placement of the badge can easily be checked utilizing either a manual or automated visual check.

In carrying out the above objects and other objects, features, and advantages of the present invention, an air bag cover having a decorative badge secured thereto is provided. The air bag includes a thermoplastic elastomeric body having a front surface and a rear surface wherein the body has a plurality of slots extending between the front and rear surfaces at predetermined spaced locations. The air bag cover further includes a decorative badge having a plurality of tabs which extend through the corresponding slots wherein each of the tabs have a bent portion pressing against the rear surface of the elastomeric body so as to create a constant load on the elastomeric body, wherein the elastomeric body exerts an opposing reaction to the substantially constant load thereby allowing the decorative badge to be secured to the elastomeric body.

In further carrying out the above object and other objects, features, and advantages of the present invention, a method is provided for making an air bag cover having a decorative badge secured thereto. The method includes injection molding a thermoplastic elastomeric body in an injection mold having a shape defining the air bag cover and forming slots at predetermined spaced locations extending through the air bag cover. The method also includes providing a decorative badge having a plurality of tabs extending therefrom at predetermined spaced locations corresponding to the spaced locations of the slots formed in the air bag cover. Still further, the method includes inserting the tabs through the slots at a front surface of the air bag cover and bending the tabs against a rear surface of the air bag cover to create a substantially constant load on the elastomeric body, wherein the elastomeric body exerts an opposing reaction to the constant load thereby allowing the decorative badge to be secured to the air bag cover.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
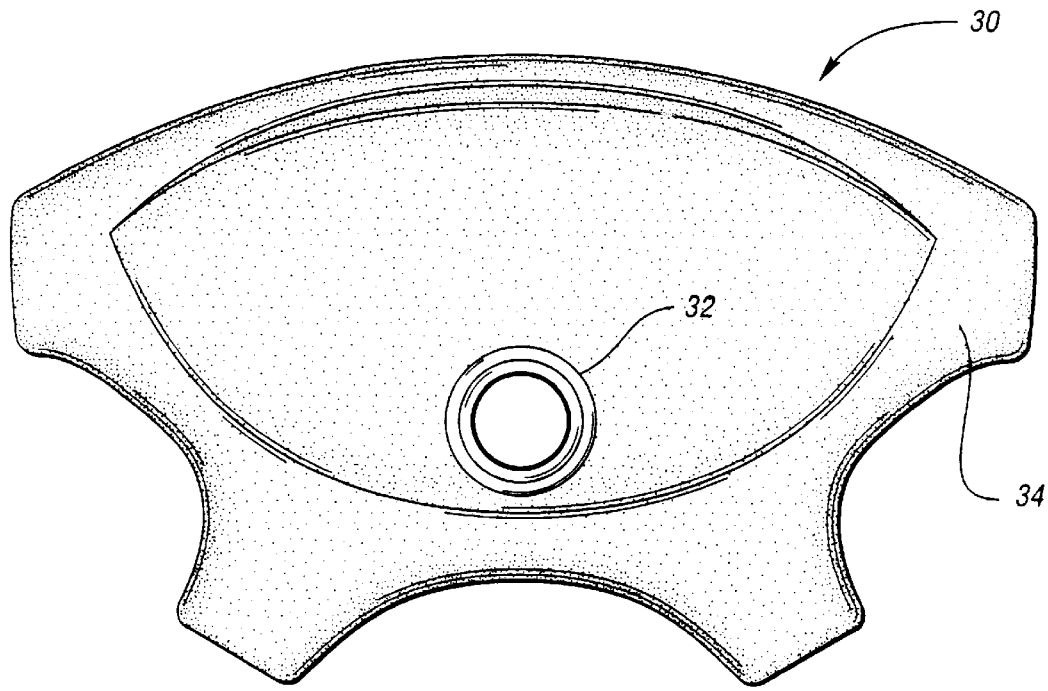
FIG. 1 is a front elevational view of an air bag cover having a decorative badge secured thereto.

Turning now to FIG. 1, there is shown a front elevational view of an air bag cover 30 having a decorative badge 32 secured to a front surface 34 of the cover 30. The air bag cover 30 is preferably installed over an inflatable air bag system. The air bag system is typically mounted at an interior end of a steering wheel post (not shown) within a steering wheel (not shown) so that the air bag may deploy between the vehicle driver and the steering wheel post to prevent injury during an accident or other period of sudden deceleration.

Figure 2:
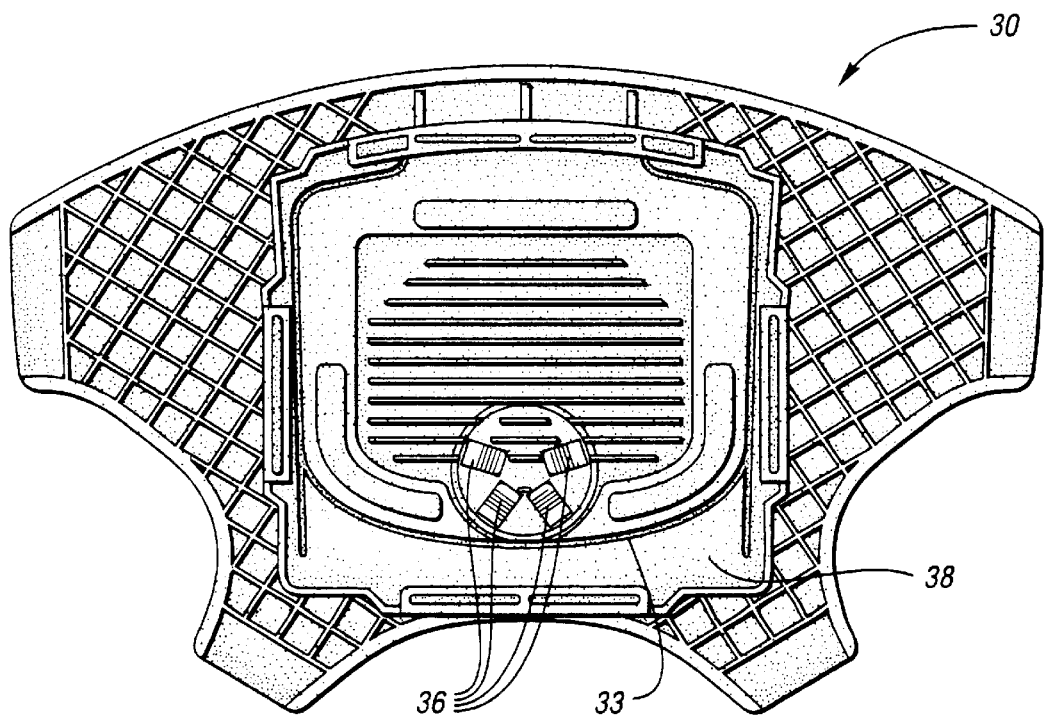
FIG. 2 is a rear elevational view of the air bag cover shown in FIG. 1.
Figure 3:
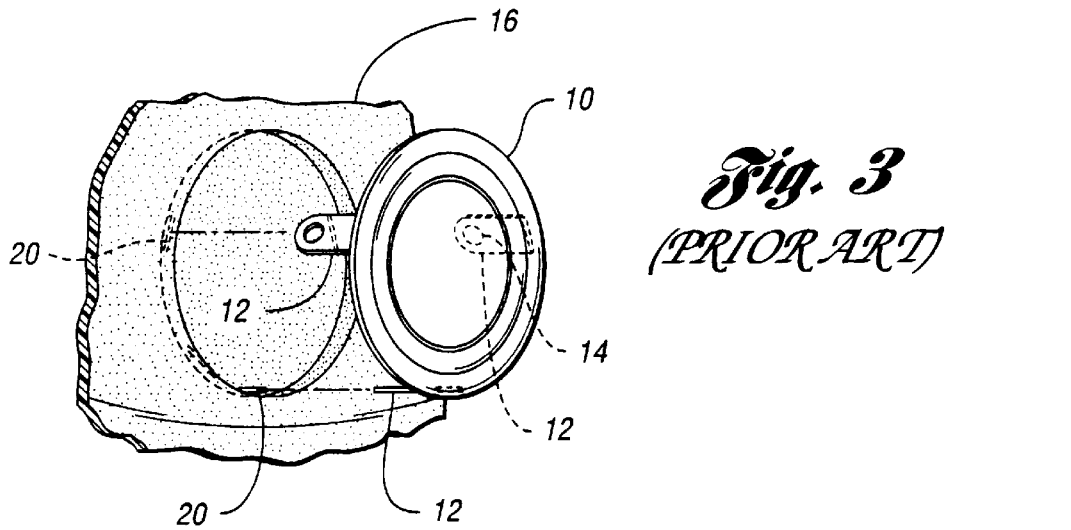
FIG. 3 is a front elevational view of an air bag cover with a decorative badge being secured thereto according to a known prior art method.
Figure 4:
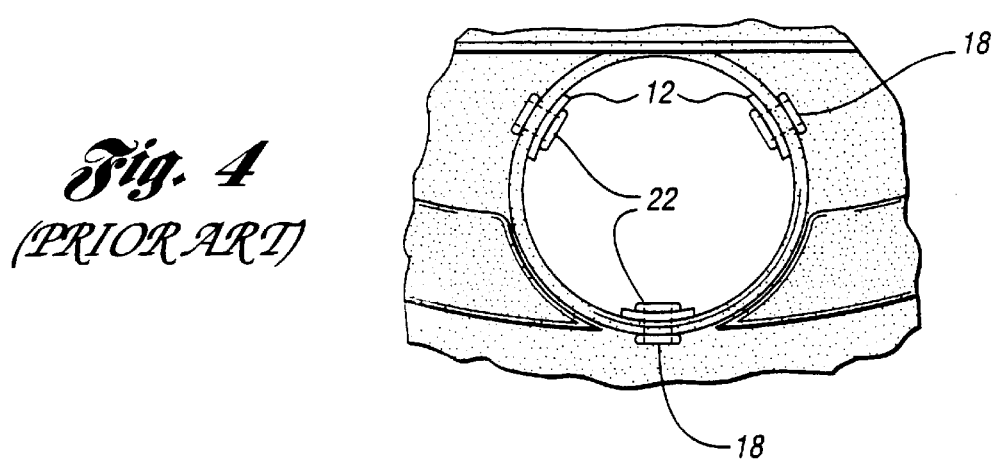
FIG. 4 is a rear elevational view of the air bag cover shown in FIG. 3.

The air bag cover 30 further includes a tear seam 33 which is visually imperceptible from the exposed front surface 34, as shown in FIGS. 1 and 2. The tear seam 33 is of a reduced thickness to permit the air bag, as it is inflating, to exert a force at a lower portion of the front surface 34 to cause the front surface 34 to separate along the tear seam 33. The tear seam 33 is therefore designed to be the primary, or sole, break area of the air bag cover 30 during inflation and exit of the air bag.

Although the decorative badge 32 shown in FIG. 1 is shown as being circular in nature, it should be appreciated that other shapes are well suited for the present invention including, but not limited to, a square badge or a triangular badge. The air bag cover 30 is preferably an elastomeric body formed utilizing any conventional injection molding process.

Figure 5:
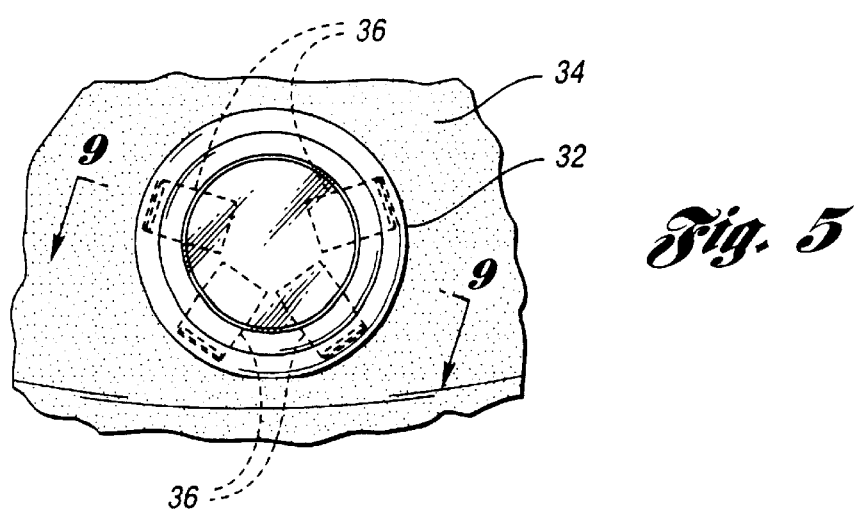
FIG. 5 is a front elevational view of a portion of the air bag cover shown in FIG. 1 illustrating the position of the tabs of the present invention in phantom.
Figure 6:
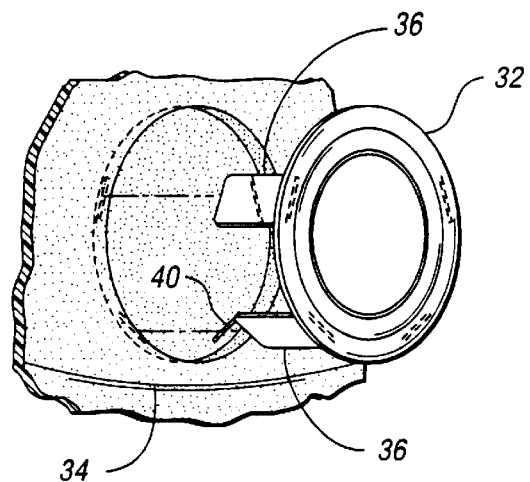
FIG. 6 is a front elevational view of an air bag cover with a decorative badge being secured thereto according to the present invention.
Figure 8:
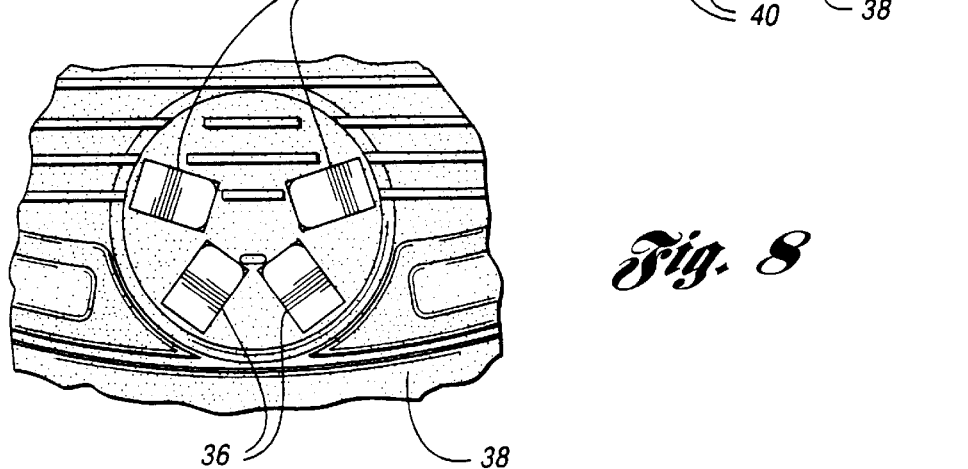
FIG. 8 is a rear elevational view of the air bag cover shown in FIG. 7 after the tabs of the decorative badge have been pushed down.

Turning now to FIGS. 2 and 8, there are shown rear elevational views of the air bag cover 30 shown in FIG. 1. The decorative badge 32 includes a plurality of tabs 36, preferably at least three tabs, bent against a rear surface 38 of the cover 30. FIG. 5, a front elevational view of the cover 30, illustrates the position of the tabs 36 in phantom.

Figure 9:
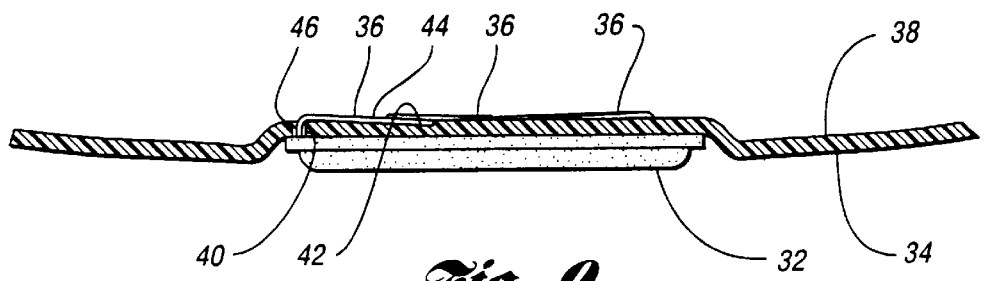
FIG. 9 is cross-sectional view of the air bag cover shown in FIG. 5 taken along reference lines 9—9 of FIG. 5.

The decorative badge 32 is secured to the air bag cover 30 by inserting the tabs 36 through corresponding slots 40 extending between the front and rear surfaces 34,38, respectively. The slots 40 may be formed during the injection molding process of the air bag cover 30 or during a subsequent step following the injection molding process. The tabs 36 are then bent against the rear surface 38 of the cover 30 to create a bent portion 44 and a vertical portion 46, as shown in FIG. 9. The vertical portion 46 extends through the slots 40, while the bent portion 44 presses against the rear surface 38 to create a substantially constant load on the elastomeric material of the cover 30. In reaction to this constant load, the elastomeric material of the cover 30 exerts an opposing reaction (spring-like force) which allows the badge 32 to be secured to the cover 30.

In the preferred embodiment, the tabs 36 are bent inwardly toward a center of the rear surface 38. Not only does this arrangement take up less space on the rear surface 38, but it also allows the badge 32 to aid in creating a greater force exerted by the elastomeric material due to the sandwich effect of the badge 32 and the tabs 36. Alternatively, the tabs 36 could be bent outwardly from the center of the rear surface 38.

The tabs 36 are preferably rectangular in shape and preferably have a length of approximately 11 mm, a width of approximately 7 mm, and a thickness of approximately 0.5–0.7 mm. Furthermore, although the tabs 36 are shown extending from an outer periphery of the badge 32, the tabs may alternatively extend from a center portion of the badge 32. In the latter case, it is preferred that the tabs 36 bend outwardly against the rear surface 38 of the cover 30.

The decorative badge 32 may be a unitary piece or comprised of two separate portions. In the first alternative, the badge 32 is preferably a 0.020 inch thick aluminum (1080 grade) material with a decorative design painted or etched on a front surface thereof. In the second alternative, the badge 32 may comprise the aluminum portion having the tabs 36 extending therefrom and an emblem portion comprising a selective pour, e.g., lensolad or acrylic, covering.

Figure 7:
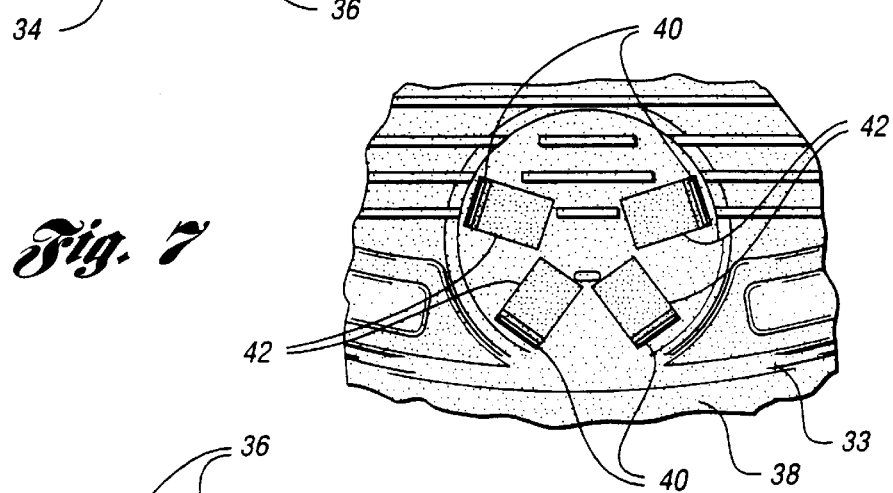
FIG. 7 is a rear elevational view of the air bag cover shown in FIG. 6 after the decorative badge has been completely inserted.

As shown in FIG. 9, the tabs 36 are preferably bent at least 90 degrees, up to approximately 110 degrees, in order to create the constant load on the elastomeric material of the air bag cover 30. To aid in aligning the tabs 36 with the rear surface 38 of the cover 30, the cover may include a plurality of depressions 42 formed in the rear surface 38, as shown in FIG. 7.

The depressions 42 correspond to the width and length of the tabs 36 and are preferably as deep as at least the thickness of the tabs 36. The depressions 42 extend away from the slots 40 and may have a downwardly extending slope to further aid in securing the badge 32 to the cover 30. The depressions 42 serve many purposes such as, but not limited to, aiding as a visual check to insure that the badge 32 is installed and aligned correctly, aiding as a visual check to insure that the tabs 36 did not break off during bending, aiding in preventing rotation of the badge 32 after installation, and aiding in hiding sharp edges during handling.

While the best modes for carrying out the invention have been described in detail, those familiar with the art to which this invention relates will recognize various alternative designs and embodiments for practicing the invention as defined by the following claims.

What is claimed is:

1. An air bag cover for an inflatable air bag system comprising:

a. one-piece thermoplastic elastomeric body having a front surface and a rear surface, the body having a plurality of non-aligned slots extending between the front and rear surfaces at predetermined spaced locations; and a decorative badge having a plurality of tabs which extend through the corresponding slots, each of the tabs having a bent portion pressing against the rear surface of the elastomeric body so as to create a constant load on the elastomeric body, wherein the elastomeric body exerts an opposing reaction to the constant load thereby allowing the decorative badge to be secured to the elastomeric body.

2. The air bag cover as recited in claim 1 wherein each of the bent portions of the tabs extend inwardly toward a center of the elastomeric body.

3. The air bag cover as recited in claim 1 wherein each of the bent portions of the tabs extend outwardly from a center of the elastomeric body.

4. The air bag cover as recited in claim 1 wherein the rear surface of the elastomeric body includes a plurality of depressions for receiving each of the bent portions of the tabs so as to aid in aligning the bent portions with the rear surface of the elastomeric body.

5. The air bag cover as recited in claim 4 wherein each of the depressions have a downwardly extending slope into the rear surface so as to further aid in securing the decorative badge to the elastomeric body.

6. The air bag cover as recited in claim 1 wherein each of the plurality of tabs have a length of approximately 11 mm.

7. The air bag cover as recited in claim 6 wherein each of the plurality of tabs have a width of approximately 7 mm.

8. The air bag cover as recited in claim 7 wherein each of the plurality of tabs have a thickness of approximately 0.5–0.7 mm.

9. The air bag cover as recited in claim 1 wherein the plurality of tabs includes at least three tabs.

10. The air bag cover as recited in claim 1 wherein the bent portions are at an angle of approximately 90–110 degrees.

11. The air bag cover as recited in claim 1 wherein the decorative badge comprises a metal portion having a decorative design thereon.

12. The air bag cover as recited in claim 11 wherein the decorative badge comprises:

an emblem having a decorative design thereon; and a metal portion including the plurality of tabs and having the emblem secured thereon.

13. A method for making an air bag cover having a decorative badge secured thereto for an inflatable air bag system, the method comprising:

injection molding a one-piece thermoplastic elastomeric body in an injection mold having a shape defining the air bag cover;

forming non-aligned slots at predetermined spaced locations extending through the body;

providing a decorative badge having a plurality of tabs extending therefrom at predetermined spaced locations corresponding to the spaced locations of the slots formed in the air bag cover;

inserting the tabs through the slots at a front surface of the air bag cover; and bending the tabs against a rear surface of the body to create a substantially constant load on the elastomeric body, wherein the elastomeric body exerts an opposing reaction to the constant load thereby allowing the decorative badge to be secured to the air bag cover.

14. The method as recited in claim 13 wherein forming the slots is performed during the injection molding of the elastomeric body.

15. The method as recited in claim 13 wherein forming the slots is performed subsequent to the injection molding of the elastomeric body.

16. The method as recited in claim 13 wherein bending the tabs includes bending the tabs inwardly toward a center of the rear surface.

17. The method as recited in claim 13 wherein bending the tabs includes bending the tabs outwardly away from a center of the rear surface.

18. The method as recited in claim 13 wherein injection molding the elastomeric body includes injection molding the elastomeric body including a plurality of depressions for receiving each of the bent portions of the tabs so as to aid in aligning the bent portions with the rear surface of the elastomeric body.

19. The method as recited in claim 18 wherein injection molding the plurality of depressions includes injection molding each of the depressions to include a downwardly extending slope into the rear surface so as to further aid in securing the decorative badge to the elastomeric body.

20. The method as recited in claim 13 wherein providing the decorative badge includes providing the decorative badge having at least three tabs.

21. The method as recited in claim 13 wherein providing the decorative badge includes providing a metal portion having a decorative design thereon.

22. The method as recited in claim 13 wherein providing the decorative badge includes providing an emblem having a decorative design thereon and a metal portion including the plurality of tabs and having the emblem secured thereon.

23. The method as recited in claim 13 wherein bending the tabs includes bending the tabs at least 90 degrees.

* * * * *